United States Patent [19]

Kordas

[11] 4,293,321

[45] Oct. 6, 1981

[54] FASTENING DEVICE FOR FILTER BAGS IN DUST-LADEN GAS FILTERS

[75] Inventor: Friedel Kordas, Recklinghausen, Fed. Rep. of Germany

[73] Assignee: Intensiv-Filter GmbH & Co. KG, Velbert, Fed. Rep. of Germany

[21] Appl. No.: 166,735

[22] Filed: Jul. 7, 1980

[30] Foreign Application Priority Data

Feb. 6, 1980 [DE] Fed. Rep. of Germany ....... 3004222

[51] Int. Cl.$^3$ .............................................. B01D 46/02
[52] U.S. Cl. ........................................ 55/357; 24/258; 55/341 R; 55/375; 55/379
[58] Field of Search .................................. 55/374–379, 55/357; 24/81 AF, 256, 258; 248/101

[56] References Cited

U.S. PATENT DOCUMENTS

| | | | |
|---|---|---|---|
| 2,421,740 | 6/1947 | Birch, Jr. .............................. | 248/101 |
| 4,014,672 | 3/1977 | Jansson .............................. | 55/379 X |
| 4,220,459 | 9/1980 | Hammond et al. ............... | 55/379 X |

Primary Examiner—Kathleen J. Prunner
Attorney, Agent, or Firm—Martin A. Farber

[57] ABSTRACT

In a fastening device for the dust-tight fastening of filter bags in a separation plate between crude gas and purified gas chambers in dust-laden gas filters, an elastic nipple, formed as a slit ring, is inserted into the open end of each filter bag.

In order to produce the radially acting fastening and sealing force, a clamping ring (6) is swingably supported in the nipple (5), said ring being provided with flats (6a) on two sides which are opposite each other. On each side of the slit in the nipple (5) two protrusions (5b) are provided between which the clamping ring (6) is locked in installed condition. In unlocked upward swung condition upon the installing or removal of the nipple (5), the clamping ring (6) can be used as handle, either without or with attached filter supporting basket (5c).

11 Claims, 6 Drawing Figures

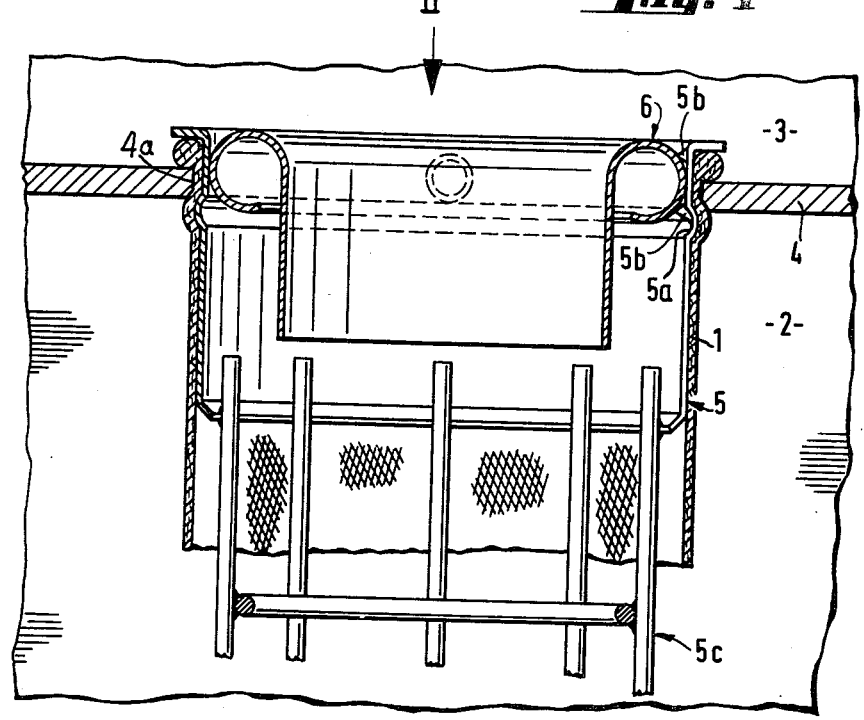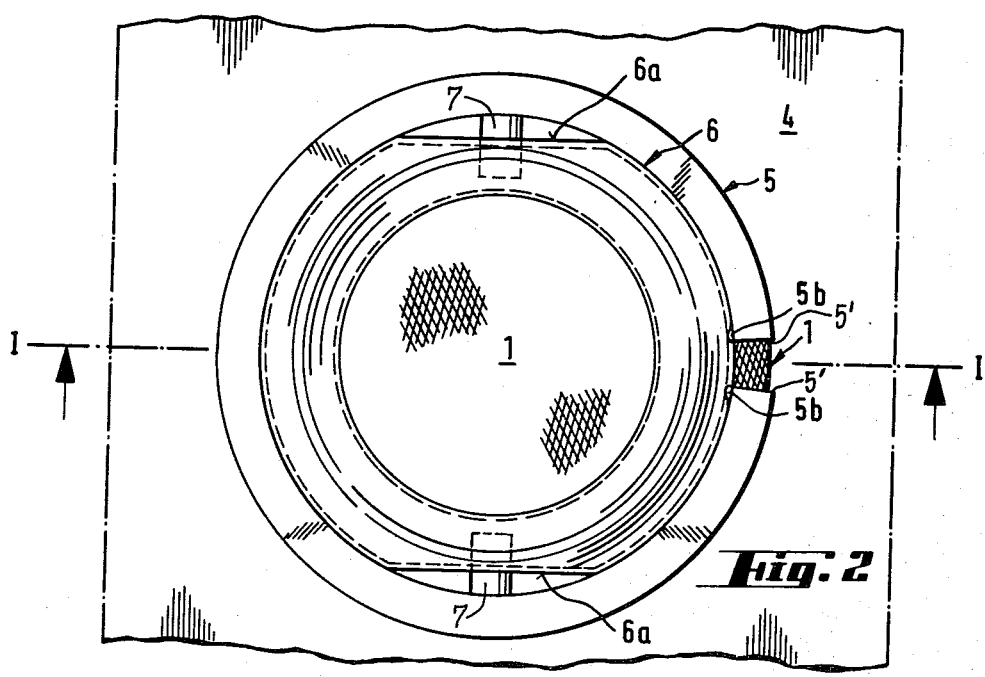

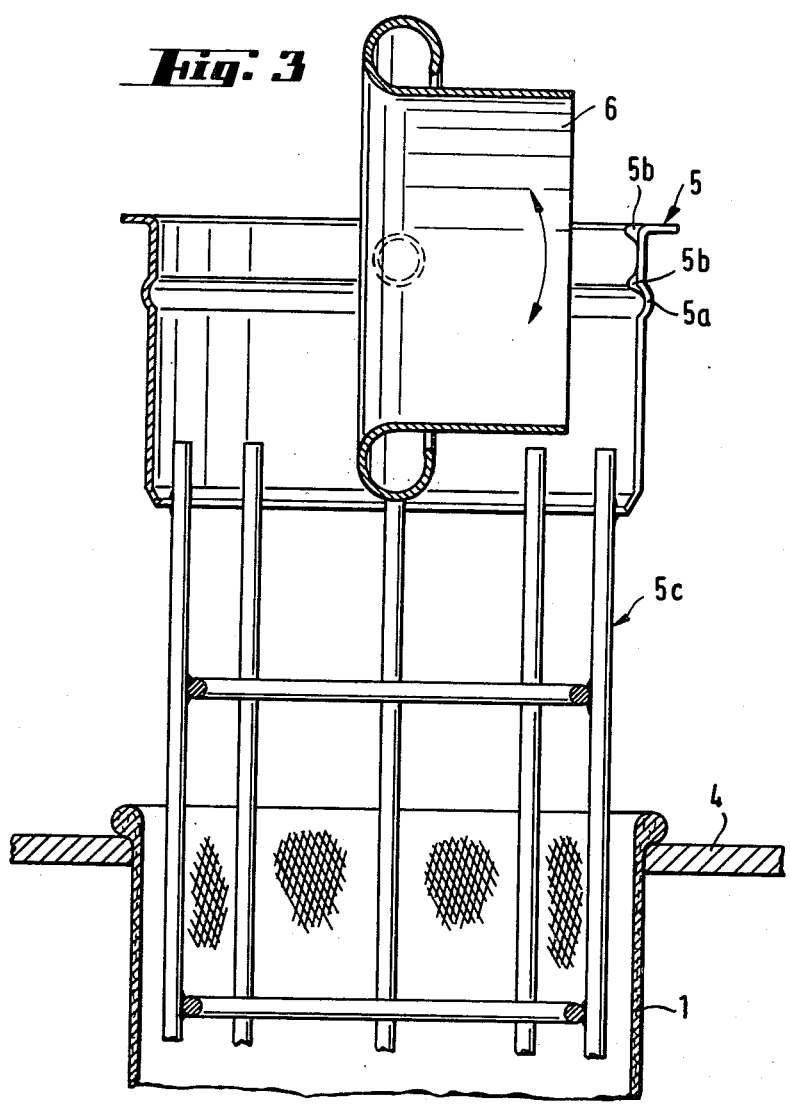

FASTENING DEVICE FOR FILTER BAGS IN DUST-LADEN GAS FILTERS

This invention relates to a device for the dust-tight attachment of filter bags in the separation plate present between crude gas and purified gas chambers in dust filters, in the form of a rapid-action attachment for the operating of which no tools are required.

In the known filter systems, the filter bags are fastened by screw connections, wire bows of spring wire, clamping bows or special mounts having two or more levers, to the partition plate. There are also known dust-laden-gas filters in which the filter bags are inserted in correspondingly shaped nipples and can be fastened, by the inserting of corresponding mating pieces, into the separation plate of the filter without the use of tools.

In all customary dust-laden-gas filter plants, the filter bags must be replaced from time to time since the built-in filter bags become worn or become clogged by the product to be filtered or, if the product is changed, the product which was previously filtered must not come into contact with the product to be subsequently filtered. The changing of the filter bags is an unproductive task which therefore should be carried out as rapidly as possible. Furthermore there are available for this work generally only workers who do not have any particular expert knowledge. Therefore, the replacement of the filter bags must be extremely simple in the practical carrying out thereof. Mistakes must absolutely be avoided upon the installation of the filter bags since defectively installed filter bags permit the passage of dust. This, however, is not permissible in accordance with the laws governing the contamination of the atmosphere by filter plants.

Furthermore, it is necessary to walk upon the separation plate upon the changing of the bags. Therefore, any inserts and structures which impede walking must be considered disadvantageous for reasons of rapid performance and prevention of accidents.

In traditional filter plants, the installing and removal of the filter bags which are fastened with wire bows or the like can, to be sure, be carried out even without the use of tools within a short period of time, but the wire bows which are swung over after the installing of the bags and the holding supports for same are very disturbing when walking over the partition plate.

The filter bag attachments with inserted nipples which are also known (German Application for Patent OS No. 26 00 339) are practical only for small filter bag diameters since the adherence and frictional forces are then too great to do without the aid of tools. In the case of strongly adhering dusts or of corrosion on the inserted nipples (which circumstances must be expected in filter plants in practical operation) the removal of the filter bags is possible only with considerable effort.

The object of the present invention is to create a dust-tight attachment for filter bags which can be handled with only a few manipulations and without the aid of tools and which is as smooth as possible on its surface and does not require any structure on top of the partition plate, can be used also for large filter bag diameters, and can be easily detached even in the case of adherent dusts and corrosion of the fastening device.

This object is achieved in accordance with the invention in the manner that at the open end of the filter bag (1) there is arranged a clamping ring (6) which is swingably supported in an elastic nipple (5), said ring being provided with flats (6a) on two opposite sides.

The advance in the art obtainable by the invention is based on the advantage that the filter bag can be replaced at any time rapidly, reliably and effortlessly. With the clamping ring swung up, the nipple can be readily inserted into the filter bag or removed from it so that a simple foolproof installation and removal is possible. Another advantage is that it is possible to compress the elastic nipple inwards when the clamping ring is swung up. In this way easy removal is possible even in the case of difficult types of dusts or after many years of operation.

One embodiment of the invention is shown by way of example in the drawing, in which:

FIG. 1 shows a preferred embodiment of the fastening device in installed condition with attached filter supporting basket, seen in cross section along the line I—I of FIG. 2;

FIG. 2 is a top view of the fastening device;

FIG. 3 shows the fastening device with the clamping ring swung out, in position prior to the installation or after the removal;

Figure 4:
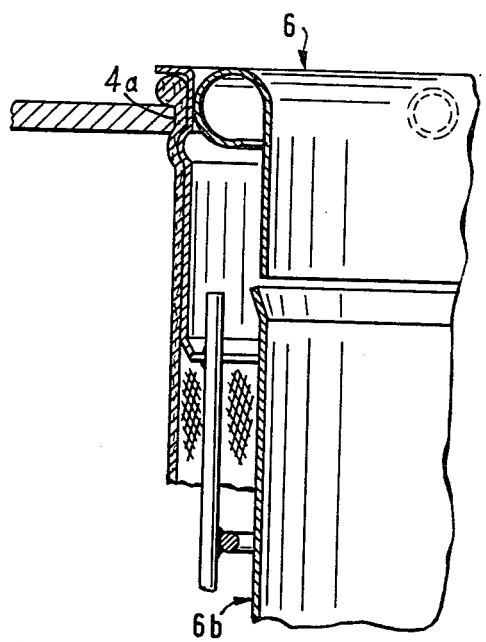
Figure 5:
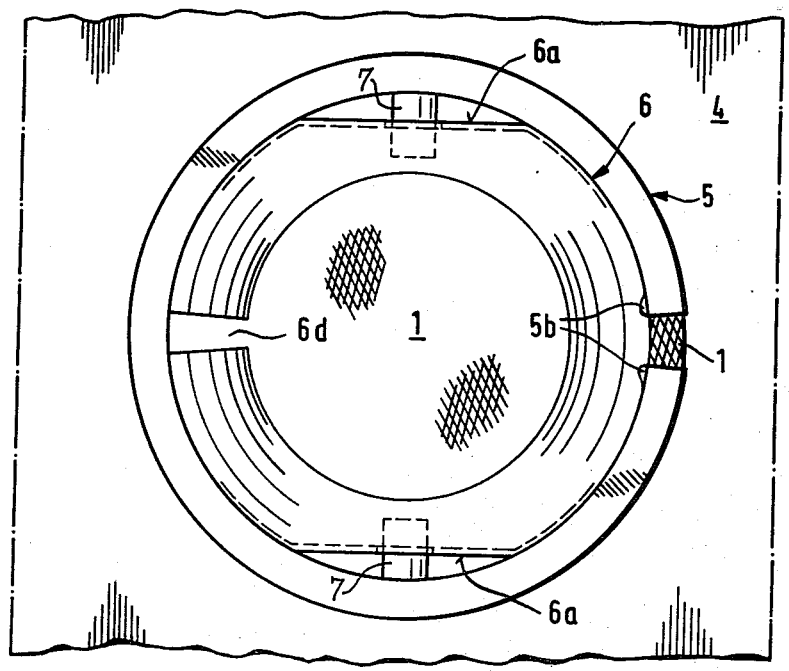
Figure 4A:
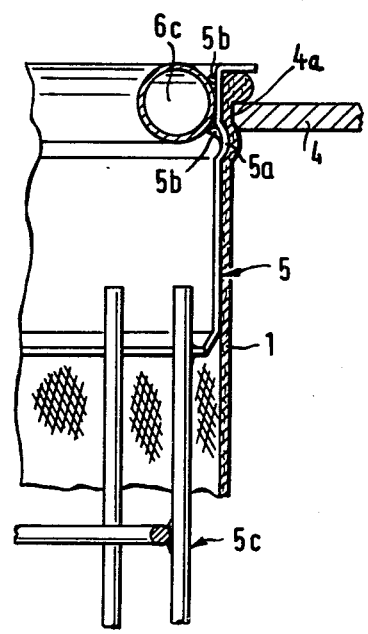

FIG. 4 in a longitudinal cross-section which is partly broken away shows a fastening device with the clamping ring formed as the upper part of an injector;

FIG. 4A in a longitudinal cross-section which is partly broken away shows a device with the clamping ring formed as a surrounding ring; and FIG. 5 is a top view of a fastening device with a slit clamping ring.

In a filter for dust-laden-gas, a crude gas chamber 2 is separated from the purified gas chamber 3 by a separation or partition plate 4 which is provided with openings 4a, each adapted to receive a filter bag 1. Into the open end of the filter bag 1 there is inserted an elastic connecting socket or nipple 5 which is made of an elastic material. If the elasticity of the material is not sufficient for the required expansion, then the nipple 5 is formed as a split ring (FIG. 2) with split 5'. In order to assure against the unintended sliding of the filter bag 1 and the fastening device out of the partition plate 4, the nipple 5 is formed with an outwardly annularly arched rib 5a.

In order to produce the radially acting fastening and sealing force, a clamping ring 6 is swingably supported in the nipple 5, the ring 6 being provided with flattened portions 6a on two sides which are opposite each other. Studs 7 are mounted on opposite sides of the socket 5 and pivotally mount the clamping ring 6 thereon via openings in the flats 6a. On each side of the slit 5' in the nipple 5 there are arranged two protrusions 5b between which the clamping ring 6 engages and between which it is locked in the installed condition. The locking force is variable in effect by the size of the protrusions.

In the unlocked, upwardly swung position of the clamping ring 6 during the installation or removal of the nipple 5, the clamping ring 6 can be used as a handle, with or without an attachment filter supporting basket 5c, as can be noted from FIG. 3. The clamping ring 6 together with the socket 5 in this manner can be installed into or removed from the filter 1. The clamping ring 6, depending on the nature of the reverse-flow system used in the filter system, can be used in different embodiments. As shown in FIG. 1 it can have the form of an inlet nozzle or, as shown in FIG. 4, it can have the form of the upper part 6 of a divided injector 6, 6b, or it can be formed merely as a circumferential ring 6c (FIG. 4A).

As shown in FIG. 5, the clamping ring 6 can also be formed with a slit 6d. In this way it is made elastic and makes possible the equalizing of any large differences in the thickness of the material of the filter bags.

The nipple connecting socket 5, without or with the filter-bag supporting basket 5c, is fastened or released, respectively, in each case by one movement of the hand by suddenly swinging the clamping ring 6 by 90° (FIG. 3). The clamping ring 6 serves simultaneously as a handle during installation and removal. The nipple socket 5 which receives the clamping ring 6 is made so elastic by the slit 5' that upon the swinging of the clamping ring 6 into the condition of attachment the nipple socket 5 presses the filter bag 1 over the entire circumference firmly against the edge of the hole 4a of the separation plate 4 and thus results in a dust-tight connection. The surrounding outwardly arched rib 5a in the nipple 5 permits a proper seat and prevents the unintentional sliding out of both the filter bag and the fastening device.

While I have disclosed several embodiments of the invention it is to be understood that these embodiments are given by example only and not in a limiting sense.

I claim:

1. A fastening device for the dust-tight attachment of a filter bag having an open end in a separation plate between crude gas and purified gas chambers in dust-laden gas filters, comprising
   an elastic socket,
   a clamping ring being swingably mounted in said elastic socket is adapted to be disposed at the open end of the filter bag with said elastic socket pressing the open end of the filter bag into holding engagement onto the separation plate,
   said clamping ring being formed with flattened portions on two sides which are opposite each other.
2. The device according to claim 1, wherein said socket is formed as a split ring defining a slit.
3. The device according to claim 2, wherein
   said socket has two protrusions on each side of said slit, said clamping ring in a fastening position coaxial to said socket is adapted to engage said protrusions.
4. The device according to claim 1 or 2, wherein said socket is formed with an outwardly arched rib adapted to overlap under the separation plate.
5. The device according to claim 1, wherein
   said clamping ring in an unlocked upwardly swung condition constitutes a handle adapted for use during installation and removal of the socket.
6. The device according to claim 5, wherein
   said socket includes a filter supporting basket attached thereto.
7. The device according to claim 1, wherein said clamping ring forms an inlet nozzle having a tubular portion.
8. The device according to claim 1, wherein
   said clamping ring constitutes an upper part of a divided two-part injector.
9. The device according to claim 1, wherein said clamping ring exclusively has the shape of a ring.
10. The device according to claim 9, wherein said clamping ring is formed with a slit.
11. The device according to claim 1, further comprising
    means for pivotally connecting said clamping ring to said elastic socket at said flattened portions, said clamping ring presses said socket radially outwardly in a fastening position of said clamping ring coaxial to said socket.

* * * * *